(12) United States Patent
Hopkins et al.

(10) Patent No.: US 11,694,058 B2
(45) Date of Patent: Jul. 4, 2023

(54) MOUNTS FOR TRACKING DEVICES

(71) Applicant: Elevation Lab, Inc., Portland, OR (US)

(72) Inventors: Casey Hopkins, Portland, OR (US); Jacob Hull, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 0 days.

(21) Appl. No.: 17/873,654

(22) Filed: Jul. 26, 2022

(65) Prior Publication Data

US 2022/0366205 A1 Nov. 17, 2022

(51) Int. Cl.
*G06K 19/077* (2006.01)

(52) U.S. Cl.
CPC . *G06K 19/07728* (2013.01); *G06K 19/07758* (2013.01)

(58) Field of Classification Search
CPC .......................... G08B 21/0453; G08B 21/043; G08B 25/005; G08B 27/005
See application file for complete search history.

(56) References Cited

U.S. PATENT DOCUMENTS

| | | | | |
|---|---|---|---|---|
| 5,748,087 | A * | 5/1998 | Ingargiola | G08B 21/0288 340/539.23 |
| 6,243,870 | B1 * | 6/2001 | Graber | G06F 1/163 2/905 |
| D571,557 | S * | 6/2008 | Lawler | D3/318 |
| RE41,102 | E * | 2/2010 | Jamel | A43D 999/00 455/562.1 |
| 9,526,433 | B2 * | 12/2016 | Lapetina | A61B 5/681 |
| 9,996,996 | B2 * | 6/2018 | Siebels | H04L 9/3278 |
| 10,176,691 | B2 * | 1/2019 | Smoak | G08B 21/0202 |
| 11,308,744 | B1 * | 4/2022 | Exantus | G08B 25/016 |
| 11,393,319 | B1 * | 7/2022 | Maisano, II | G08B 27/005 |
| 2002/0197960 | A1 * | 12/2002 | Lee | A41D 1/005 455/66.1 |
| 2006/0061546 | A1 * | 3/2006 | Jong | G06F 1/1656 345/156 |
| 2008/0165056 | A1 * | 7/2008 | Bader | G01S 5/0027 340/686.1 |
| 2008/0198585 | A1 * | 8/2008 | Tait | A45C 15/06 362/156 |
| 2008/0293453 | A1 * | 11/2008 | Atlas | H04M 1/72412 455/567 |
| 2010/0097012 | A1 * | 4/2010 | Tait | A45C 15/06 362/156 |
| 2010/0238033 | A1 * | 9/2010 | Blumel | A61B 5/0022 340/8.1 |
| 2012/0147594 | A1 * | 6/2012 | Tait | A45C 15/06 362/156 |
| 2013/0208938 | A1 * | 8/2013 | Midha | A41D 27/205 340/870.02 |
| 2014/0002239 | A1 * | 1/2014 | Rayner | G08B 13/2462 340/5.61 |
| 2014/0180019 | A1 * | 6/2014 | Martinez | A61B 5/681 600/300 |

(Continued)

*Primary Examiner* — Curtis J King
(74) *Attorney, Agent, or Firm* — Kolitch Romano Dascenzo Gates LLC

(57) ABSTRACT

Mounts for securing a tracking device to an object. The mounts include a case and a coupler system. The case includes a body defining a port complementarily configured with the tracking device to receive the tracking device. The coupler system is configured to couple the case to the object and includes a fabric expanse.

18 Claims, 20 Drawing Sheets

(56) References Cited

U.S. PATENT DOCUMENTS

| | | | | |
|---|---|---|---|---|
| 2015/0150319 A1* | 6/2015 | Walmsley | A41D 15/04 | 2/69.5 |
| 2015/0297134 A1* | 10/2015 | Albert | A61B 5/681 | 600/509 |
| 2015/0356861 A1* | 12/2015 | Daoura | G08B 21/0277 | 340/539.13 |
| 2015/0356862 A1* | 12/2015 | Daoura | G08C 17/02 | 340/12.5 |
| 2015/0359127 A1* | 12/2015 | Daoura | H05K 7/1427 | 361/752 |
| 2016/0058149 A1* | 3/2016 | Dhanasekaran | A45C 13/185 | 150/106 |
| 2016/0071392 A1* | 3/2016 | Hankey | G08B 21/0446 | 340/573.1 |
| 2016/0073914 A1* | 3/2016 | Lapetina | A61B 5/282 | 600/384 |
| 2016/0247156 A1* | 8/2016 | Hwang | G06Q 20/405 | |
| 2016/0247379 A1* | 8/2016 | Forbes | G08B 21/023 | |
| 2016/0266606 A1* | 9/2016 | Ricci | G06F 1/163 | |
| 2016/0291162 A1* | 10/2016 | Larkins | G01S 19/16 | |
| 2016/0307381 A1* | 10/2016 | Siebels | G06F 21/35 | |
| 2017/0079336 A1* | 3/2017 | Hirschberg | A41B 1/08 | |
| 2017/0135414 A1* | 5/2017 | Fultz | A41D 13/002 | |
| 2017/0302099 A1* | 10/2017 | Bolden | A45C 15/00 | |
| 2017/0360169 A1* | 12/2017 | Stein | A45C 1/024 | |
| 2018/0299991 A1* | 10/2018 | Juhasz | A45C 3/001 | |
| 2018/0325426 A1* | 11/2018 | Shaw | A61B 5/0024 | |
| 2018/0357876 A1* | 12/2018 | Smoak | G08B 21/0288 | |
| 2019/0103012 A1* | 4/2019 | Daoura | G08B 21/0247 | |
| 2020/0107522 A1* | 4/2020 | Kersey | G08B 21/0261 | |
| 2020/0169848 A1* | 5/2020 | Daoura | H04W 4/80 | |
| 2020/0352300 A1* | 11/2020 | Sube | A45C 13/001 | |
| 2021/0020020 A1* | 1/2021 | Rothschild | G08B 21/0453 | |
| 2021/0274315 A1* | 9/2021 | Daoura | H04W 4/06 | |
| 2021/0306807 A1* | 9/2021 | Kashani-Nejad | G08B 7/06 | |
| 2022/0265214 A1* | 8/2022 | Jariwala | A61B 5/28 | |

* cited by examiner

MOUNTS FOR TRACKING DEVICES

BACKGROUND

The present disclosure relates generally to mounts. In particular, mounts for tracking devices are described.

Tracking devices, also known as smart tags, are becoming increasingly sophisticated, portable, and affordable. One well known tracking device is the Apple® AirTag®. Tracking devices provide useful information related to the location of an object. Tracking devices may be mounted to an object, placed in a bag with an object, or stored within a compartment of an object.

Known mounts for tracking devices are not entirely satisfactory. For example, existing mounts are bulky, inconvenient to use, and/or insufficiently robust. It would be desirable to have a mount for tracking devices that was small and unobtrusive. Further, there would be advantages to having a strong mount that protected tracking devices from impact and moisture damage. It would be beneficial if a mount for tracking devices was easy to use and easy to secure to objects.

Thus, there exists a need for mounts for tracking devices that improve upon and advance the design of known mounts. Examples of new and useful mounts relevant to the needs existing in the field are discussed below.

SUMMARY

The present disclosure is directed to mounts for securing a tracking device to an object. The mounts include a case and a coupler system. The case includes a body defining a port complementarily configured with the tracking device to receive the tracking device. The coupler system is configured to couple the case to the object.

In some examples, the case is formed from plastic. The case may be impact resistant and/or deformation resistant.

This document describes certain examples where the case includes a cover configured to selectively couple to the body in a position enclosing the tracking device within the port. In certain examples, the cover selectively couples to the body with a mechanical fastener.

In select embodiments, the body has a first major profile, and the cover has a second major profile that is continuous with the first major profile.

As described below, in particular instances the case is substantially seamless when the cover selectively couples to the body.

In some examples, the coupler system includes a backplate selectively coupled to the case. This document describes certain examples where the object is a pet collar having a first major face and a second major face that is opposite the first major face. The case may abut the first major face and the backplate may abut the second major face. In select embodiments, the backplate selectively couples to the case with a mechanical fastener that extends through the pet collar.

As described below, in particular instances the coupler system includes a fabric expanse. In some examples, the fabric expanse defines an opening complementarily configured with the case to receive the case.

This document describes certain examples where the case defines a flange coupled to the body. The flange may be larger than the opening of the fabric expanse. The flange may abut the fabric expanse when the body extends through the opening of the fabric expanse to restrict the case from passing fully through the opening. In select embodiments, the flange surrounds the port.

As described below, in particular instances the coupler system includes an adhesive layer disposed on the fabric expanse. The adhesive layer may be spaced from the opening to define a border ring. In some examples, the flange abuts the fabric expanse within the border ring. This document describes certain examples where the coupler system includes an adhesive layer disposed on the fabric expanse. In select embodiments, the coupler system includes a backing layer disposed on the adhesive layer. In some examples, the backing layer is selectively removable to expose the adhesive layer.

DETAILED DESCRIPTION

Figure 1:
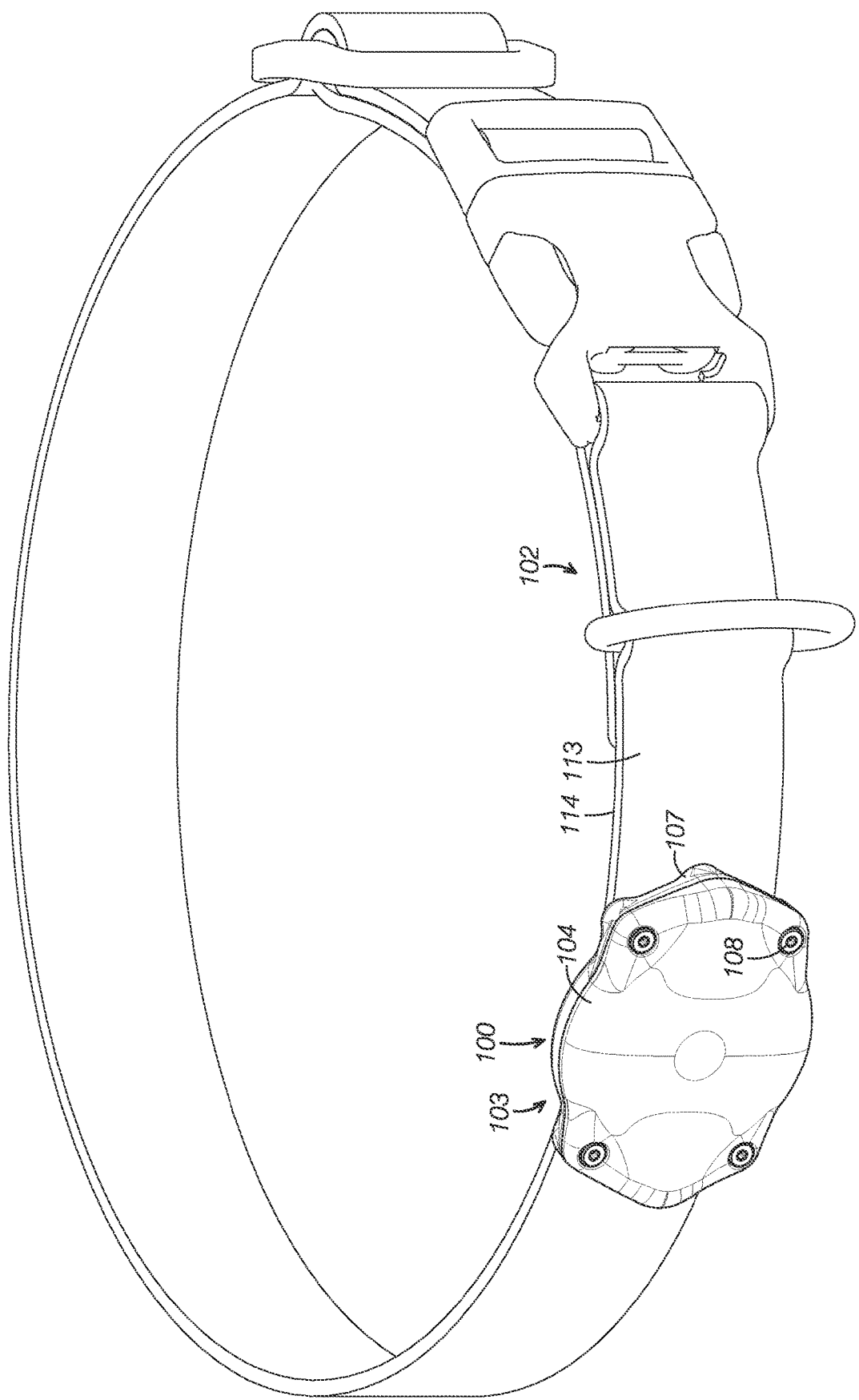
FIG. 1 is a perspective view of a first embodiment of a mount mounted to a pet collar.

The disclosed mounts will become better understood through review of the following detailed description in conjunction with the figures. The detailed description and figures provide merely examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various mounts are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

Mounts for Tracking Devices

With reference to the figures, mounts for tracking devices will now be described. The mounts discussed herein function to mount tracking devices, smart tags, or other small electronic devices to objects. The mounts may secure tracking devices to a wide range of objects, including pet collars, backpacks, purses, satchels, and clothing.

The reader will appreciate from the figures and description below that the presently disclosed mounts address many of the shortcomings of conventional mounts. For example, the novel mounts described below are small and unobtrusive. Further, the novel mounts discussed herein are strong and protect tracking devices from impact and moisture damage. An additional benefit of the novel mounts disclosed in this document is that they are easy to use and easy to secure to objects.

Contextual Details

Ancillary features relevant to the mounts described herein will first be described to provide context and to aid the discussion of the mounts.

Object

The mounts described in this document are often used to secure tracking devices to a wide variety of objects. For example, as shown in FIG. 1, a mount 100 secures to an object 102 in the form of a pet collar. The reader can see in FIG. 1 that the pet collar includes a first major face 113 and a second major face 114. As depicted in FIG. 1, second major face 114 is opposite first major face 113.

Figure 9:
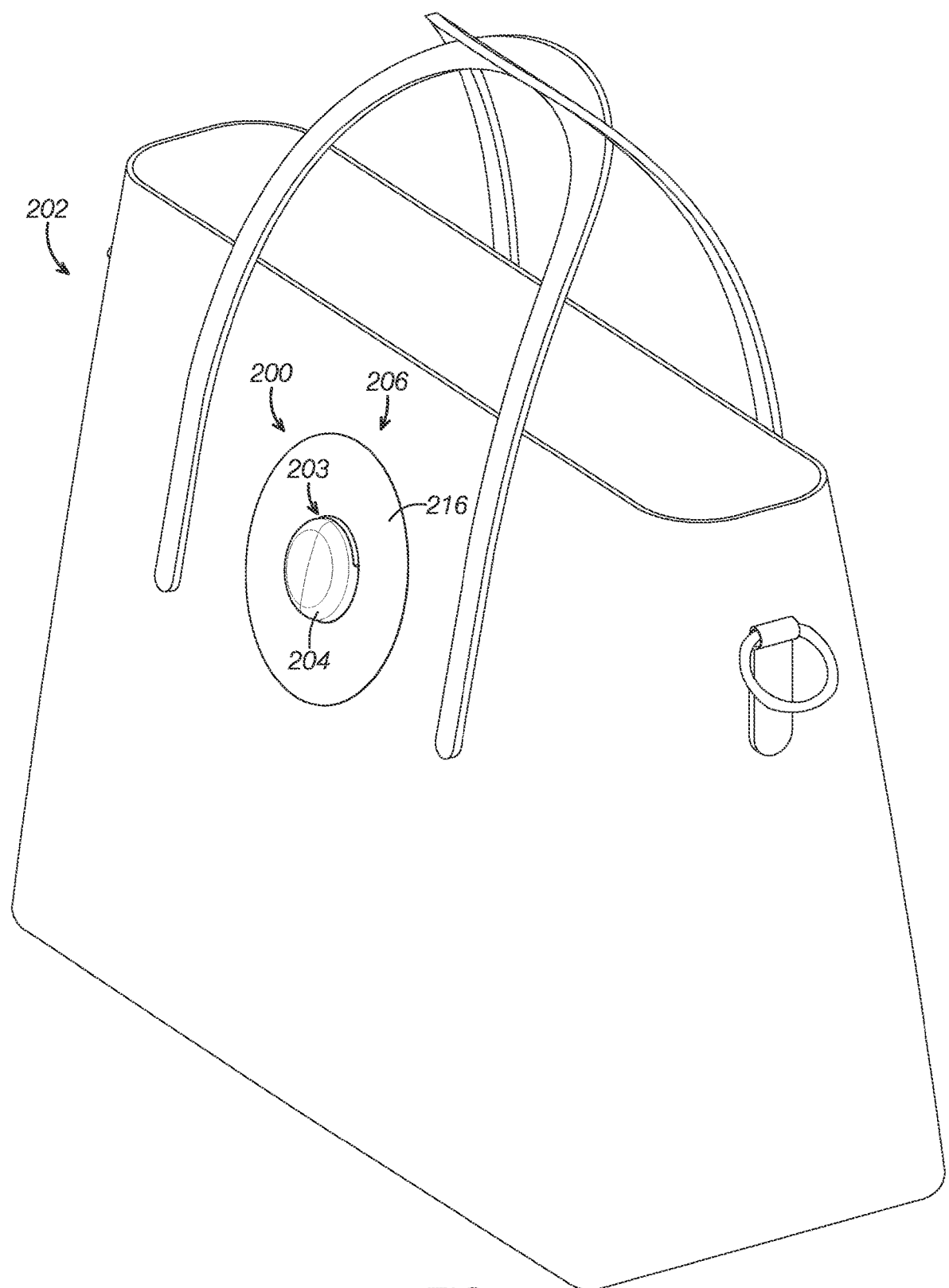
FIG. 9 is a top perspective view of a second embodiment of a mount adhered to a bag.

With reference to FIG. 9, a mount 200 secures to an object 202 in the form of a purse. The mounts may be used with a wide variety of other objects.

Indeed, the object may be any currently known or later developed type of object. A variety of object types exist and could be used in place of the objects shown in the figures. In addition to the types of objects existing currently, it is contemplated that the mounts described herein could be used with new types of objects developed in the future.

In the example shown in FIG. 1, the pet collar is composed of nylon. However, the pet collar or other type of object may be composed of any currently known or later developed suitable material.

The size and shape of the object may be varied as needed for a given application. In some examples, the object is larger relative to the other components than depicted in the figures. In other examples, the object is smaller relative to the other components than depicted in the figures. Further, the reader should understand that the object and the other components may all be larger or smaller than described herein while maintaining their relative proportions.

Tracking Device

Figure 18:
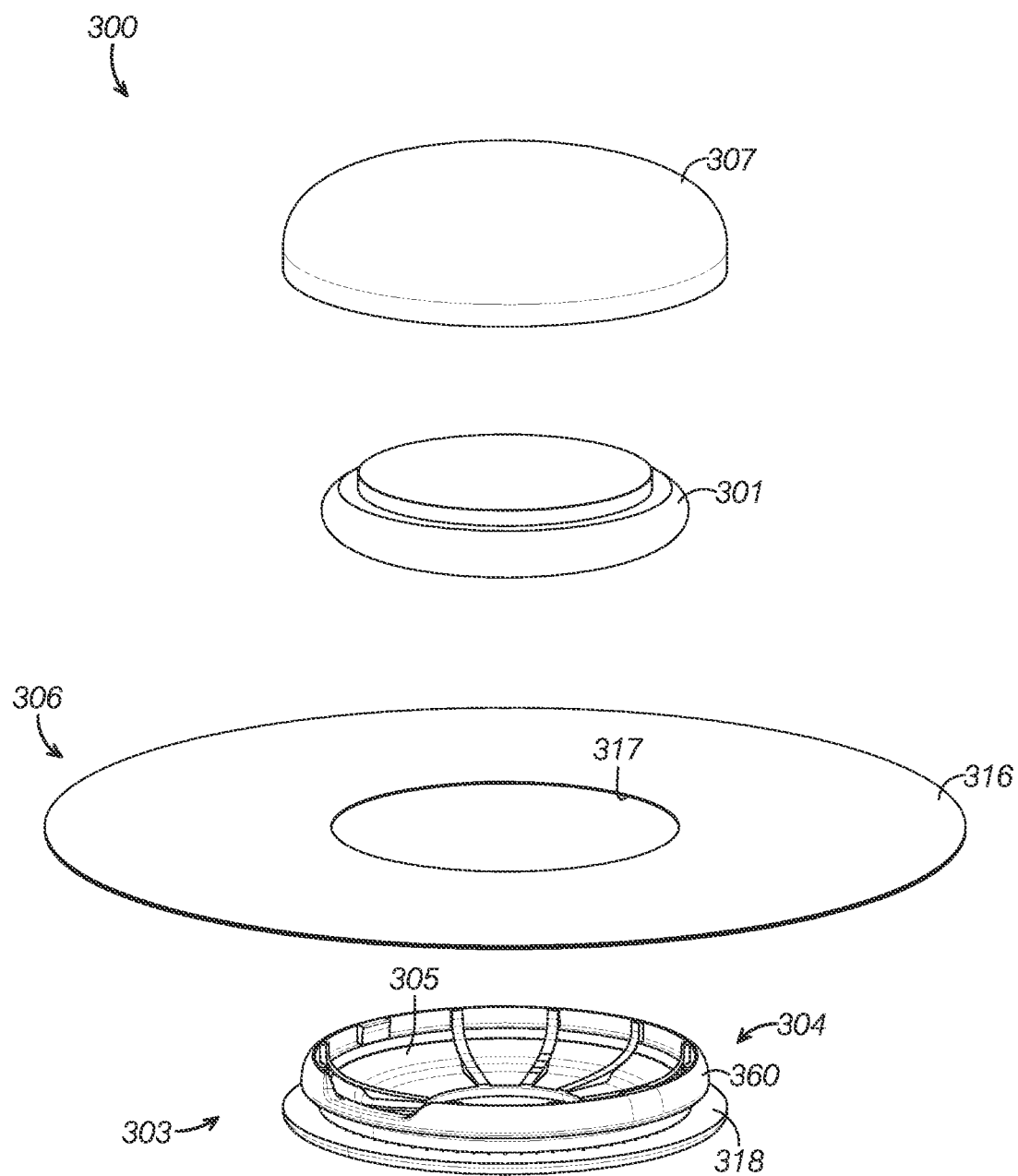
FIG. 18 is an exploded view of a third embodiment of a mount, which includes a cover that couples to a body via a friction fit.
Figure 19:
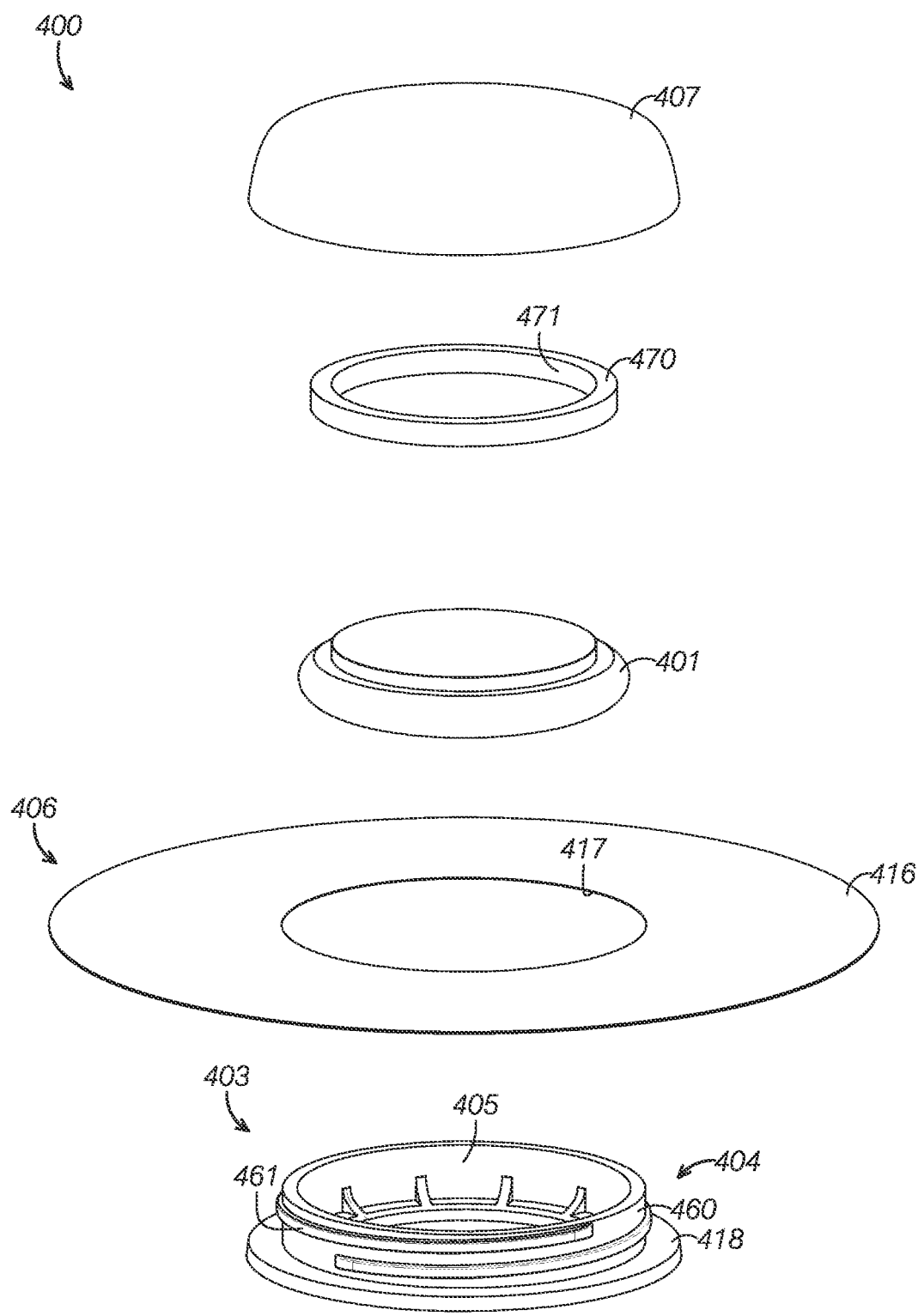
FIG. 19 is an exploded view of a fourth embodiment of a mount, which includes a cover that threadingly couples to a body.

The mounts disclosed herein are often used to protect tracking devices and to secure tracking devices to objects. Two examples of a tracking device, tracking device 301 and tracking device 401, are depicted in FIGS. 18 and 19, respectively. The size and shape of the tracking device or other type of device may be varied as needed for a given application.

The tracking device may be any currently known or later developed type of tracking device, including the Apple® AirTag® smart tag. A variety of tracking device types exist and could be used. In addition to the types of tracking devices existing currently, it is contemplated that the mounts described herein could be used with new types of tracking devices developed in the future.

Mount Embodiment One

With reference to FIGS. 1-8, a mount 100 will now be described as a first example of a mount. As shown in FIGS. 1-8, mount 100 is for securing a tracking device to an object 102.

With reference to FIGS. 1-8, mount 100 includes a case 103 and a coupler system 106. The case and the coupler system are described in more detail in the sections below. In other examples, the mount includes fewer components than depicted in the figures. In certain examples, the mount includes additional or alternative components than depicted in the figures.

The size and shape of the mount may be varied as needed for a given application. In some examples, the mount is larger relative to the other components than depicted in the figures. In other examples, the mount is smaller relative to the other components than depicted in the figures. Further, the reader should understand that the mount and the other components may all be larger or smaller than described herein while maintaining their relative proportions.

Case

Case 103 functions to contain and protect the tracking device. The reader can see in FIG. 1 that case 103 abuts first major face 113 of the pet collar object. The reader can see in FIGS. 1-8 that case 103 includes a body 104 and a cover 107. The body and cover features are described in the sections below.

In the present example, case 103 is robustly configured. In particular, case 103 is impact resistant, deformation resistant, and forms a moisture seal.

The size and shape of the case may be varied as needed for a given application. In some examples, the case is larger relative to the other components than depicted in the figures. In other examples, the case is smaller relative to the other components than depicted in the figures. Further, the reader should understand that the case and the other components may all be larger or smaller than described herein while maintaining their relative proportions.

Body 104 functions to receive and protect the tracking device. Body 104 defines a port (obscured by cover 107 in the figures). The port is complementarily configured with the tracking device to the receive tracking device.

The size and shape of the body and the port may be varied as needed for a given application. In some examples, the body and/or the port are larger relative to the other components than depicted in the figures. In other examples, the body and/or the port are smaller relative to the other components than depicted in the figures. Further, the reader should understand that the body, the port and the other components may all be larger or smaller than described herein while maintaining their relative proportions.

Figure 2:
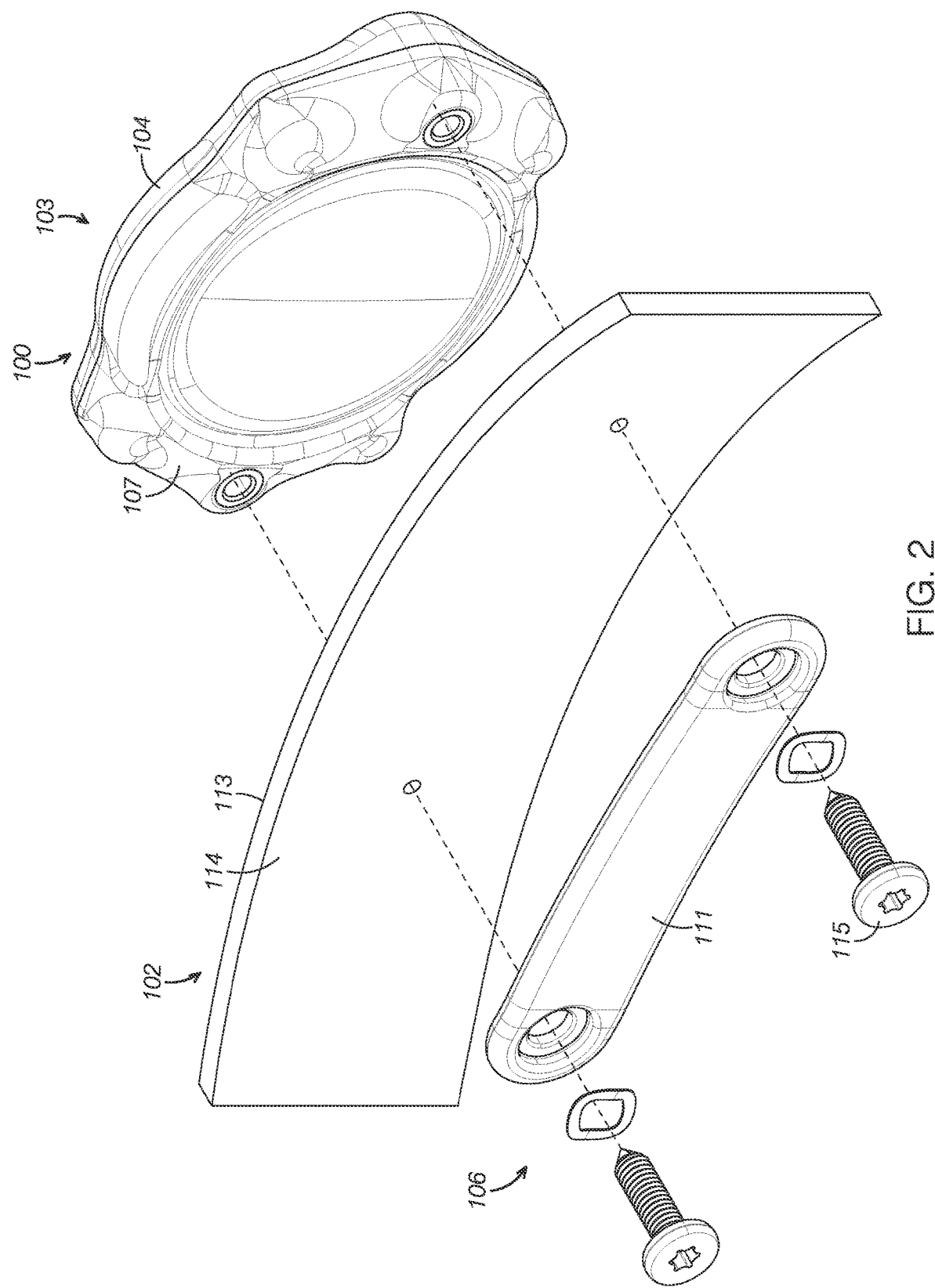
FIG. 2 is an exploded view of the mount shown in FIG. 1.
Figure 3:
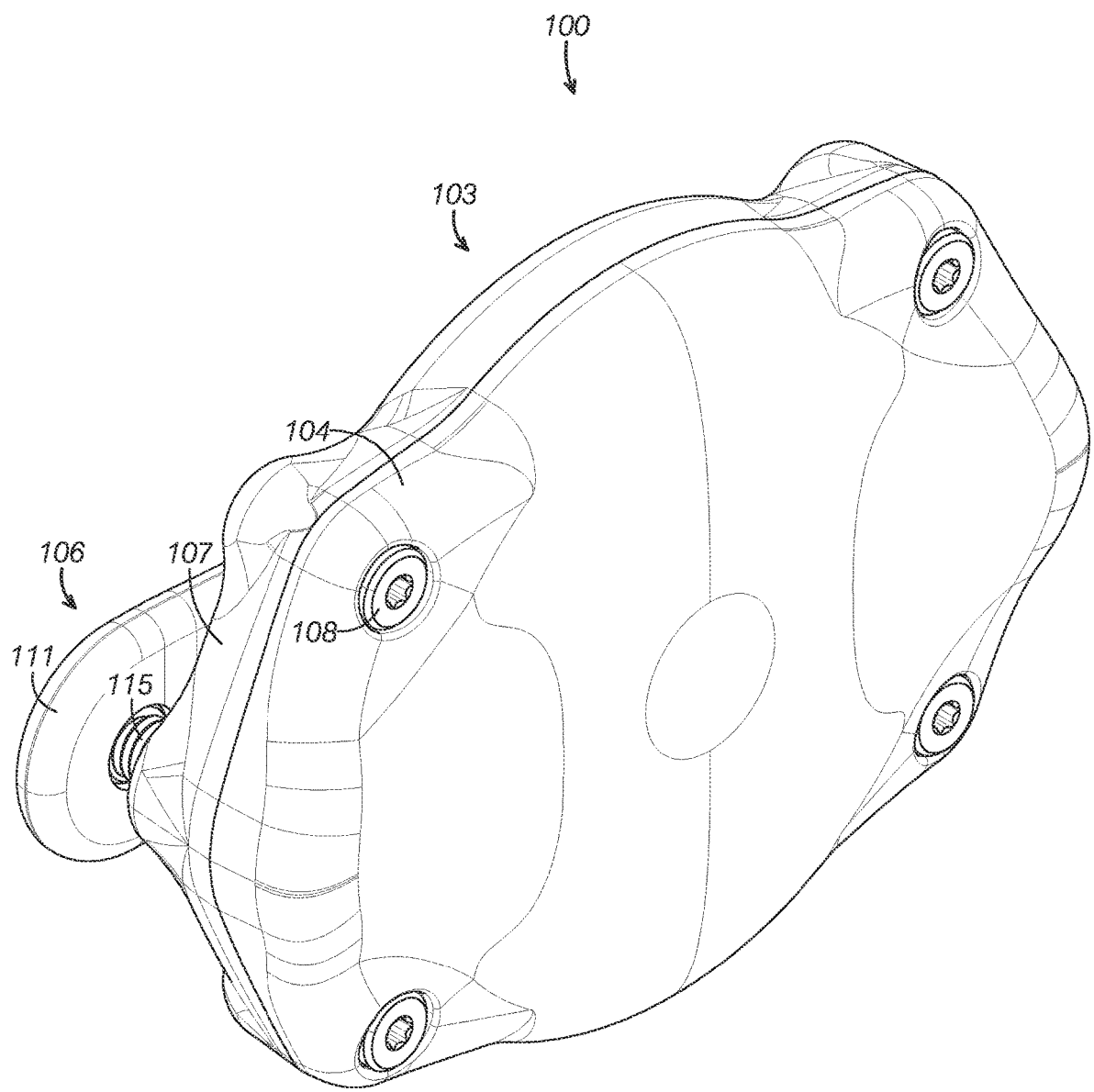
FIG. 3 is a top front perspective view of the mount shown in FIG. 1.
Figure 4:
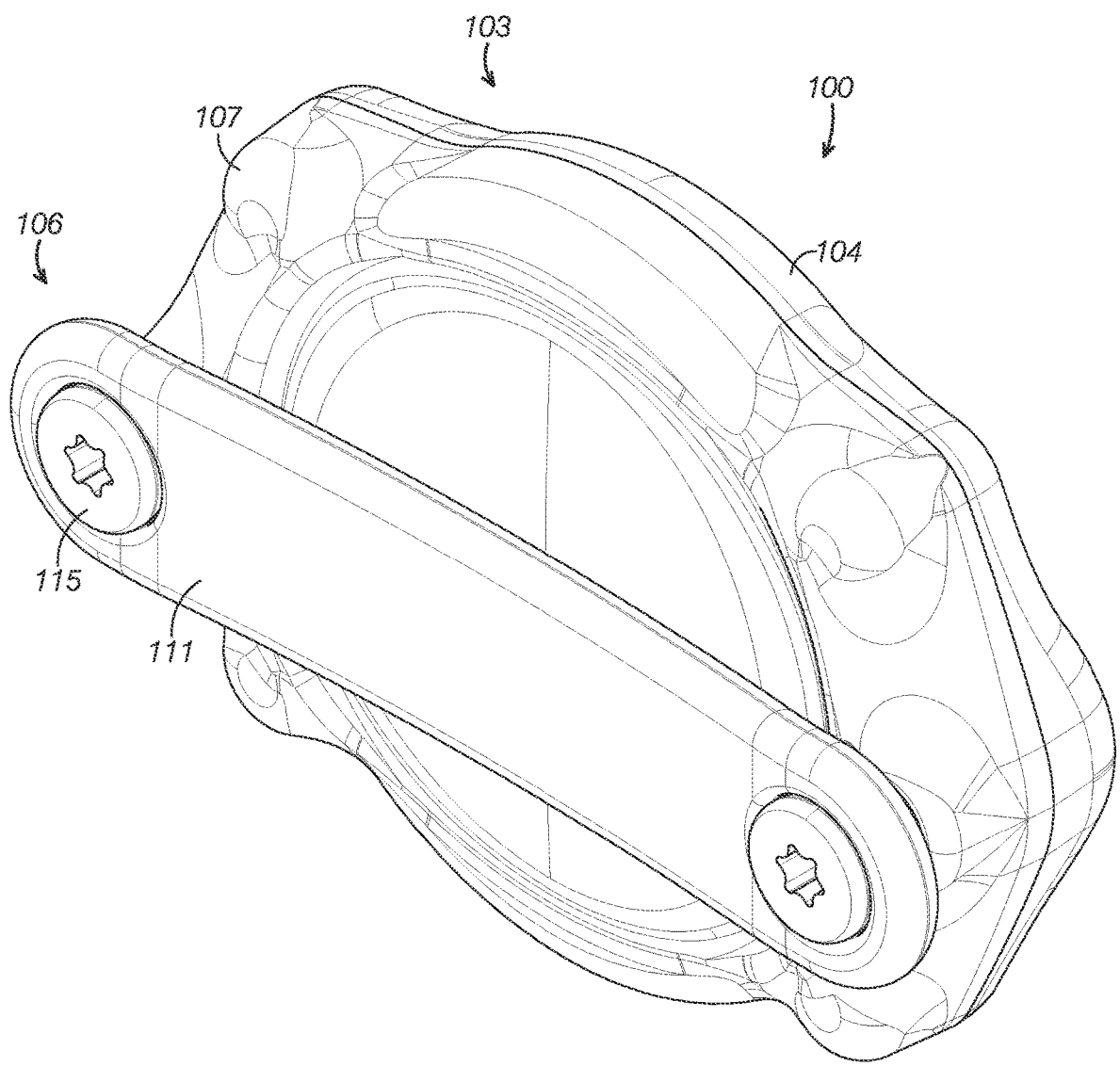
FIG. 4 is a bottom back perspective view of the mount shown in FIG. 1.
Figure 8:
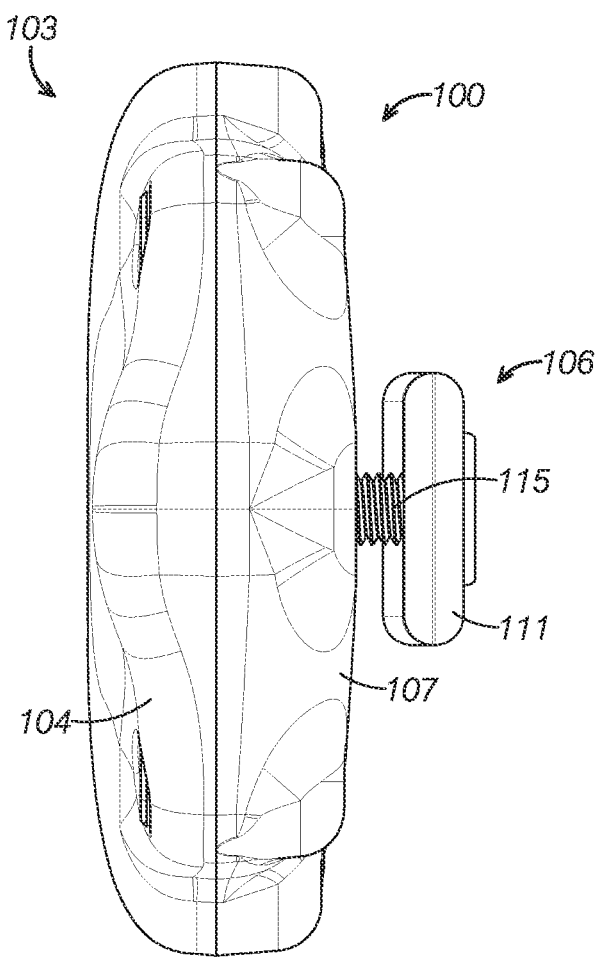
FIG. 8 is a right-side elevation view of the mount shown in FIG. 1.

As shown in FIGS. 1-8, body 104 has a first major profile. With reference to FIGS. 4 and 8, cover 107 has a second major profile complementing the first major profile. As shown in FIGS. 4 and 8, the second major profile is substantially continuous with the first major profile of body 104. The reader can see in FIGS. 4 and 8 that case 103 is substantially seamless when cover 107 selectively couples to body 104.

In the present example, the body is composed of plastic. However, the case may be composed of any currently known or later developed material suitable for device protection applications. Suitable materials include metals, polymers, ceramics, wood, and composite materials.

Cover

Cover 107 functions to cover the tracking device within the port and to provide selective access to the port. With reference to FIGS. 2, 4, and 8, cover 107 is configured to selectively couple to body 104. In particular, cover selectively couples to body 104 in a position enclosing the tracking device within the port.

Figure 5:
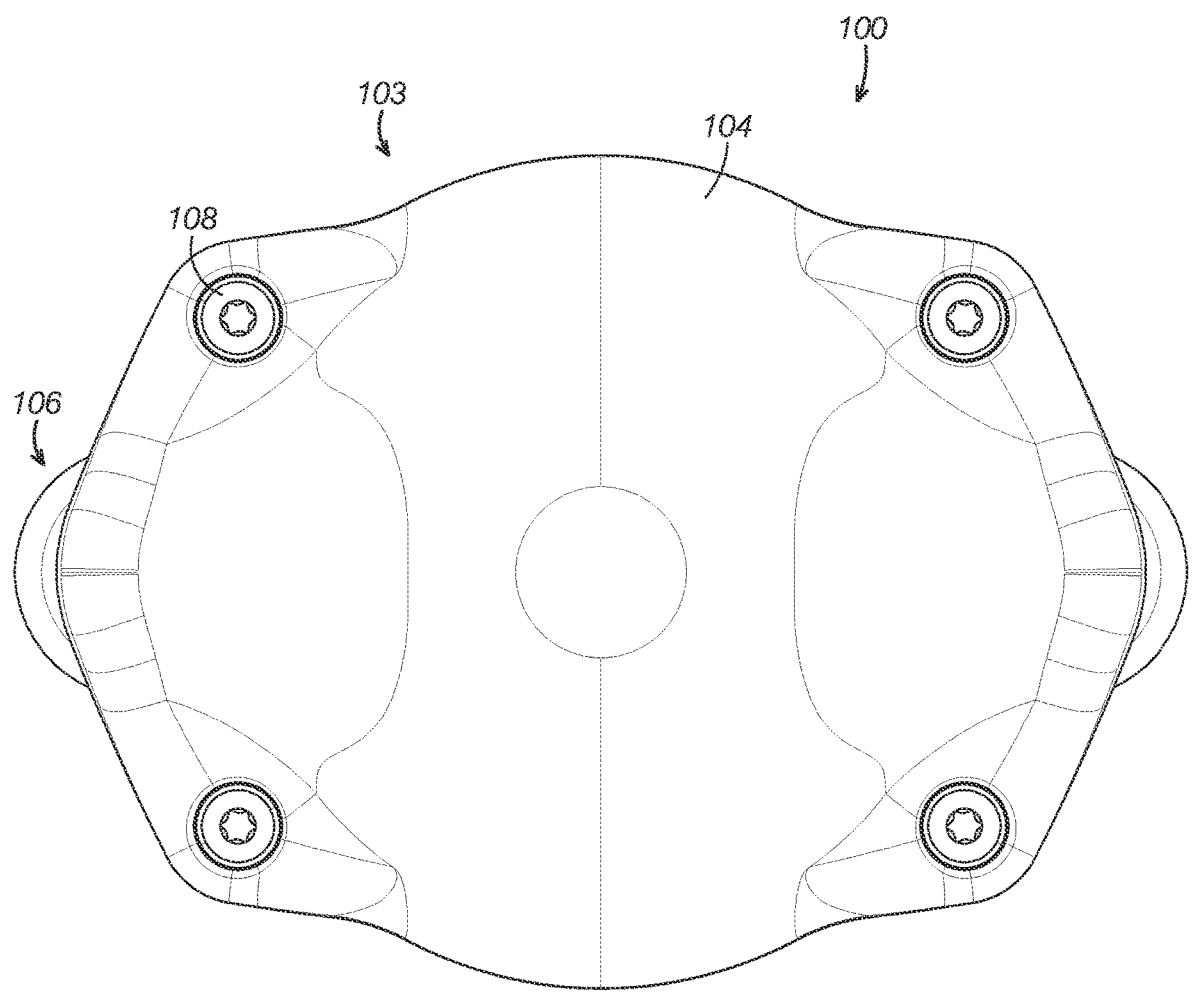
FIG. 5 is a front elevation view of the mount shown in FIG. 1.
Figure 6:
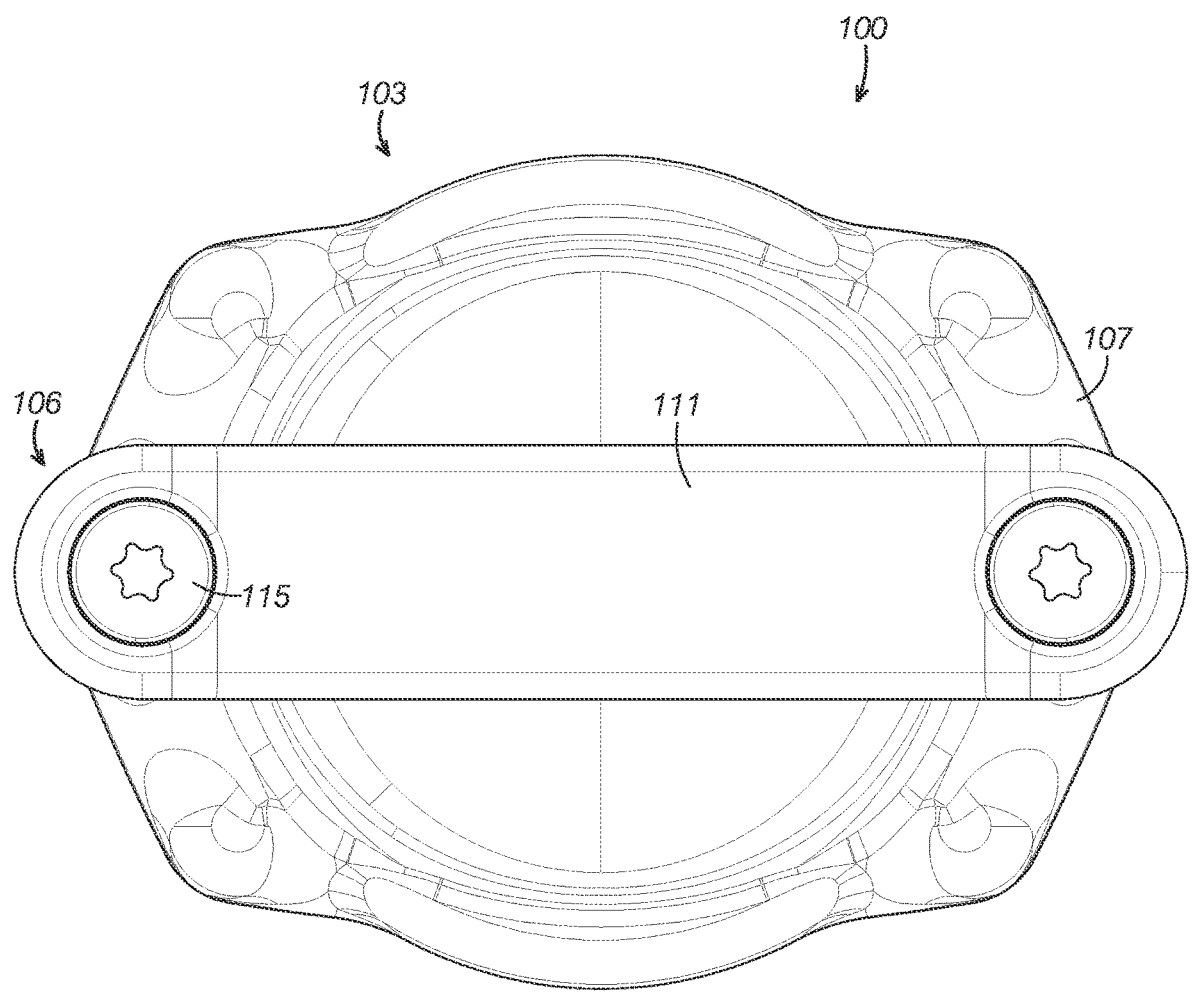
FIG. 6 is a rear elevation view of the mount shown in FIG. 1.
Figure 7:
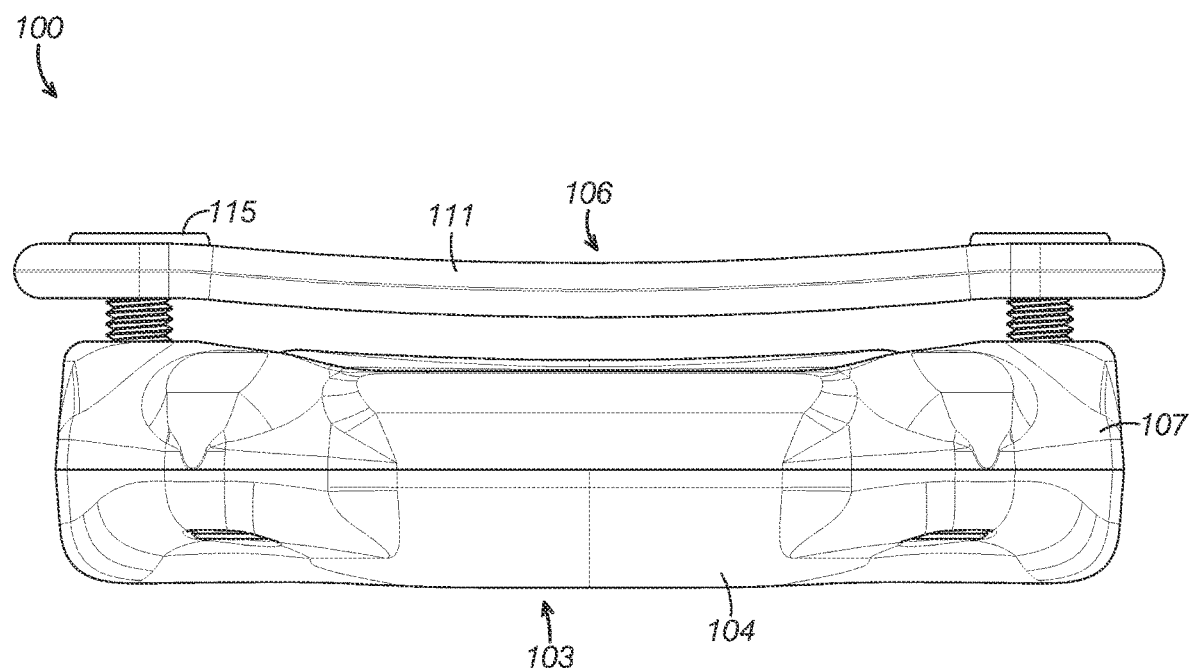
FIG. 7 is a top plan view of the mount shown in FIG. 1.

As depicted in FIGS. 1, 3, and 5, cover 107 selectively couples to body 104 with first mechanical fasteners 108. In other examples, the body and cover selectively couple by other means, such as friction fits or magnetic coupling.

With reference to FIGS. 2, 4, and 8, cover 107 has a second major profile. The reader can see in FIGS. 4 and 8 that the second major profile is substantially continuous with the first major profile of body 104. As shown in FIGS. 4 and 8, case 103 is substantially seamless when cover 107 selectively couples to body 104.

In the present example, the cover is composed of plastic. However, the cover may be composed of any currently known or later developed material suitable for covering applications. Suitable materials include metals, polymers, ceramics, wood, and composite materials.

The size and shape of the cover may be varied as needed for a given application. In some examples, the cover is larger relative to the other components than depicted in the figures. In other examples, the cover is smaller relative to the other components than depicted in the figures. Further, the reader should understand that the cover and the other components may all be larger or smaller than described herein while maintaining their relative proportions.

Coupler System

The reader can see in FIGS. 1-8 that coupler system 106 is configured to couple case 103 to object 102. As depicted in FIGS. 2-8, coupler system 106 includes a backplate 111 selectively coupled to case 103. In particular, backplate 111 couples to cover 107.

The coupler system may be any currently known or later developed type of coupler system. A variety of coupler system types exist and could be used in place of the coupler system shown in the figures. In addition to the types of coupler systems existing currently, it is contemplated that the mounts described herein could incorporate new types of coupler systems developed in the future.

The size and shape of the coupler system may be varied as needed for a given application. In some examples, the coupler system is larger relative to the other components than depicted in the figures. In other examples, the coupler system is smaller relative to the other components than depicted in the figures. Further, the reader should understand that the coupler system and the other components may all be larger or smaller than described herein while maintaining their relative proportions.

Backplate

The role of backplate 111 is to frictionally engage object 102. In the example shown in FIGS. 1-8, the pet collar is compressed between backplate 111 and cover 107 to secure case 103 to the pet collar. With reference to FIG. 2, cover 107 abuts first major face 113 of object 102 and backplate 111 abuts second major face 114 of object 102 when backplate 111 couples to case 103.

As shown in FIG. 2, backplate 111 selectively couples to case 103 with mechanical fasteners 115. Mechanical fasteners 115 extend through the pet collar.

The number of backplates in the mount may be selected to meet the needs of a given application. The reader should appreciate that the number of backplates may be different in other examples than is shown in the figures. For instance, some mount examples include additional or fewer backplates than described in the present example.

In the present example, the backplate is composed of plastic. However, the backplate may be composed of any currently known or later developed material suitable for anchoring applications. Suitable materials include metals, polymers, ceramics, wood, and composite materials.

The size and shape of the backplate may be varied as needed for a given application. In some examples, the backplate is larger relative to the other components than depicted in the figures. In other examples, the backplate is smaller relative to the other components than depicted in the figures. Further, the reader should understand that the backplate and the other components may all be larger or smaller than described herein while maintaining their relative proportions.

Mechanical Fasteners

The mechanical fasteners may be any currently known or later developed type of mechanical fastener. Various mechanical fastener types exist and could be used in place of the mechanical fasteners shown in the figures. In addition to the types of mechanical fasteners existing currently, it is contemplated that the mounts described herein could incorporate new types of mechanical fasteners developed in the future.

In the present example, the mechanical fasteners are composed of metal. However, the mechanical fasteners may be composed of any currently known or later developed material suitable for fastening applications.

The size and shape of the mechanical fasteners may be varied as needed for a given application. In some examples, the mechanical fasteners are larger relative to the other components than depicted in the figures. In other examples, the mechanical fasteners are smaller relative to the other components than depicted in the figures. Further, the reader should understand that the mechanical fasteners and the other components may all be larger or smaller than described herein while maintaining their relative proportions.

Additional Embodiments

With reference to FIGS. 9-20 not yet discussed in detail, the discussion will now focus on an additional mount embodiment. The additional embodiments include many similar or identical features to mount 100. Thus, for the sake of brevity, each feature of the additional embodiments below will not be redundantly explained. Rather, key distinctions between the additional embodiments and mount 100 will be described in detail and the reader should reference the discussion above for features substantially similar between the different mount examples.

Mount Embodiment Two

Turning attention to FIGS. 9-16, a mount 200 will now be described as a second example of a mount. As can be seen in FIGS. 9-16, mount 200 includes a case 203 and a coupler system 206. Coupler system 206 in particular is configured differently than coupler system 106 described above. Case 203 and coupler system 206 are explained in more detail in the sections below.

Case

Figure 11:
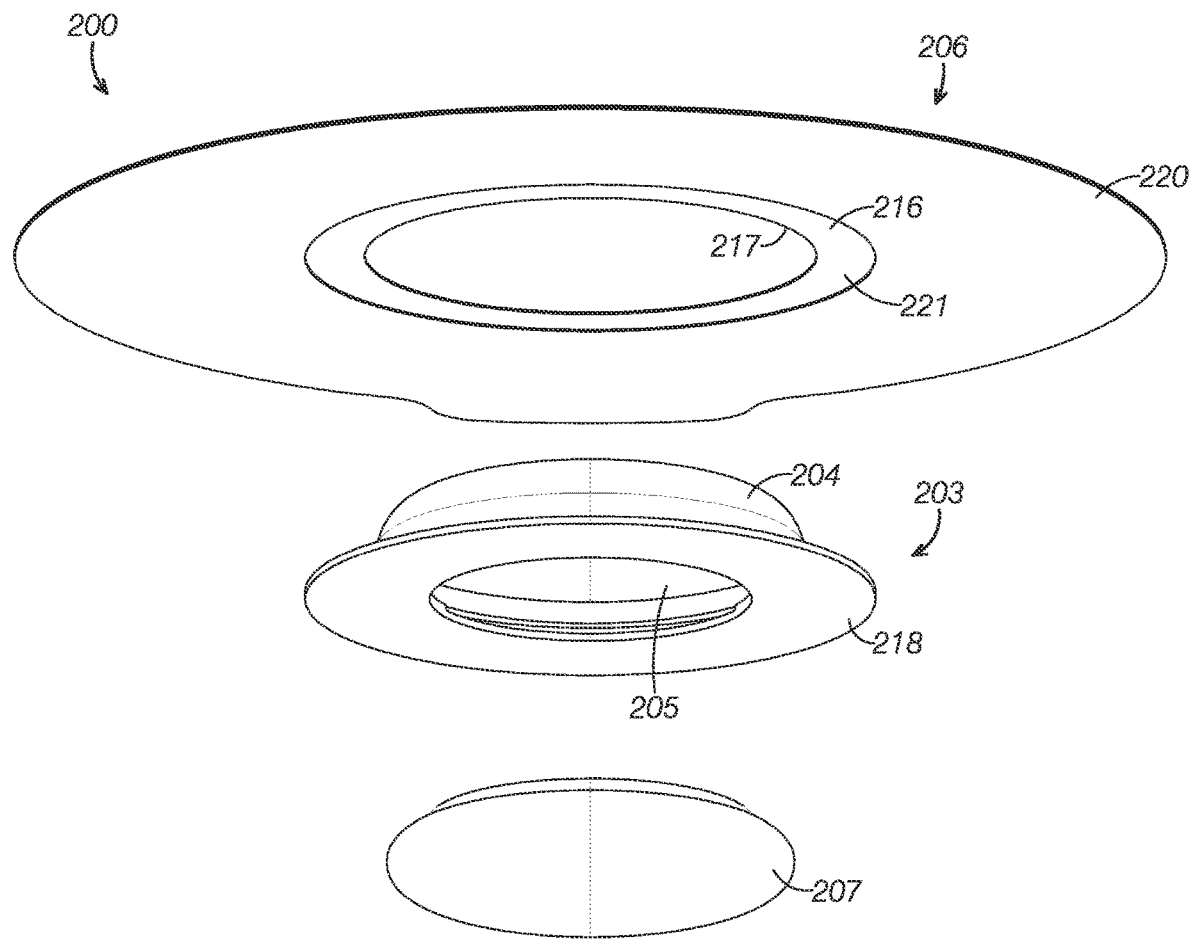
FIG. 11 is a front perspective view of the mount shown in FIG. 9 with a case spaced below an opening of a coupler system.
Figure 12:
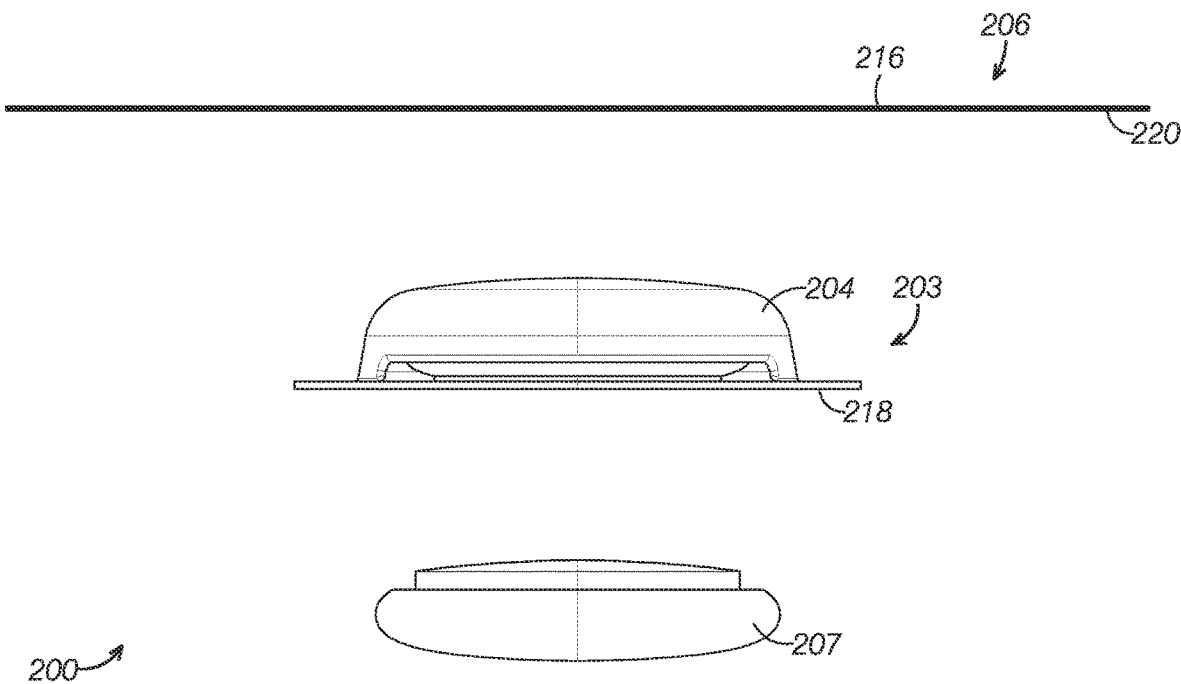
FIG. 12 is a front elevation view of the mount shown in FIG. 9 with a case spaced below an opening of a coupler system.
Figure 13:
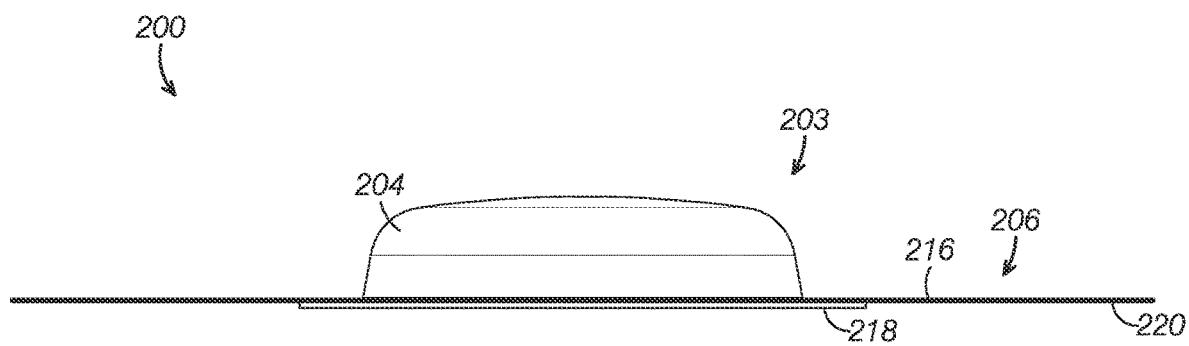
FIG. 13 is a rear elevation view of the mount shown in FIG. 9.

The reader can see in FIGS. 11 and 12 that case 203 includes a body 204 and a cover 207. As shown in FIG. 11, body 204 defines a port 205 in which the tracking device may reside and be protected. As depicted in FIGS. 11-13, and 15-17, body 204 also defines a flange 218.

Flange

Flange 218 functions to interface with fabric expanse 216. In particular, with reference to FIGS. 11-13 and 15-17, flange 218 abuts fabric expanse 216 when body 204 extends through opening 217 of fabric expanse 216. The reader can see in FIG. 11 that flange 218 abuts fabric expanse 216 within border ring 221. Flange 218 abutting fabric expanse 216 restricts case 203 from passing fully through opening 217.

With reference to FIGS. 11 and 12, the reader can see that flange 218 is coupled to body 204. As shown in FIGS. 11, flange 218 surrounds port 205. As depicted in FIG. 11, flange 218 is larger than opening 217 of fabric expanse 216. As a result of being larger than opening 217, flange 218 restricts case 203 from passing fully through opening 217.

The size and shape of the flange may be varied as needed for a given application. In some examples, the flange is larger relative to the other components than depicted in the figures. In other examples, the flange is smaller relative to the other components than depicted in the figures. Further, the reader should understand that the flange and the other components may all be larger or smaller than described herein while maintaining their relative proportions.

Coupler System

Coupler system 206 functions to couple case 203 to object 202. In the embodiment shown in FIGS. 9-16, coupler system 206 includes a fabric expanse 216, an adhesive layer (not pictured), and a backing layer 220.

Fabric Expanse

Figure 10:
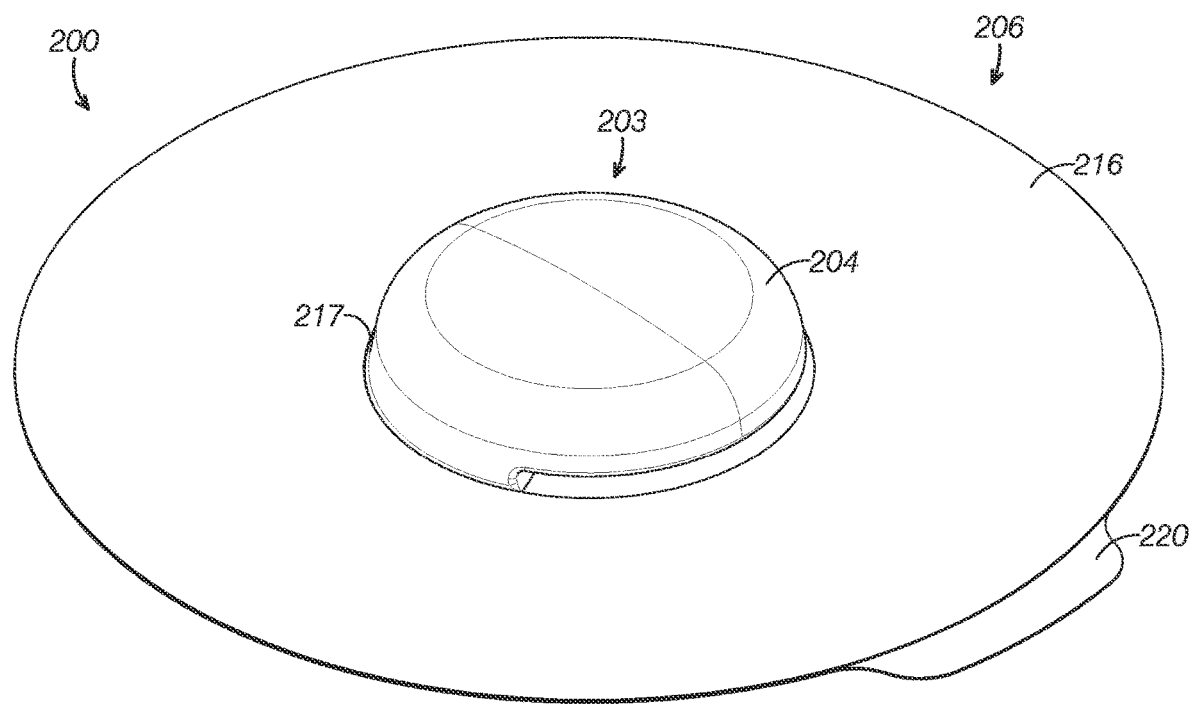
FIG. 10 is a top perspective view of the mount shown in FIG. 9.
Figure 14:
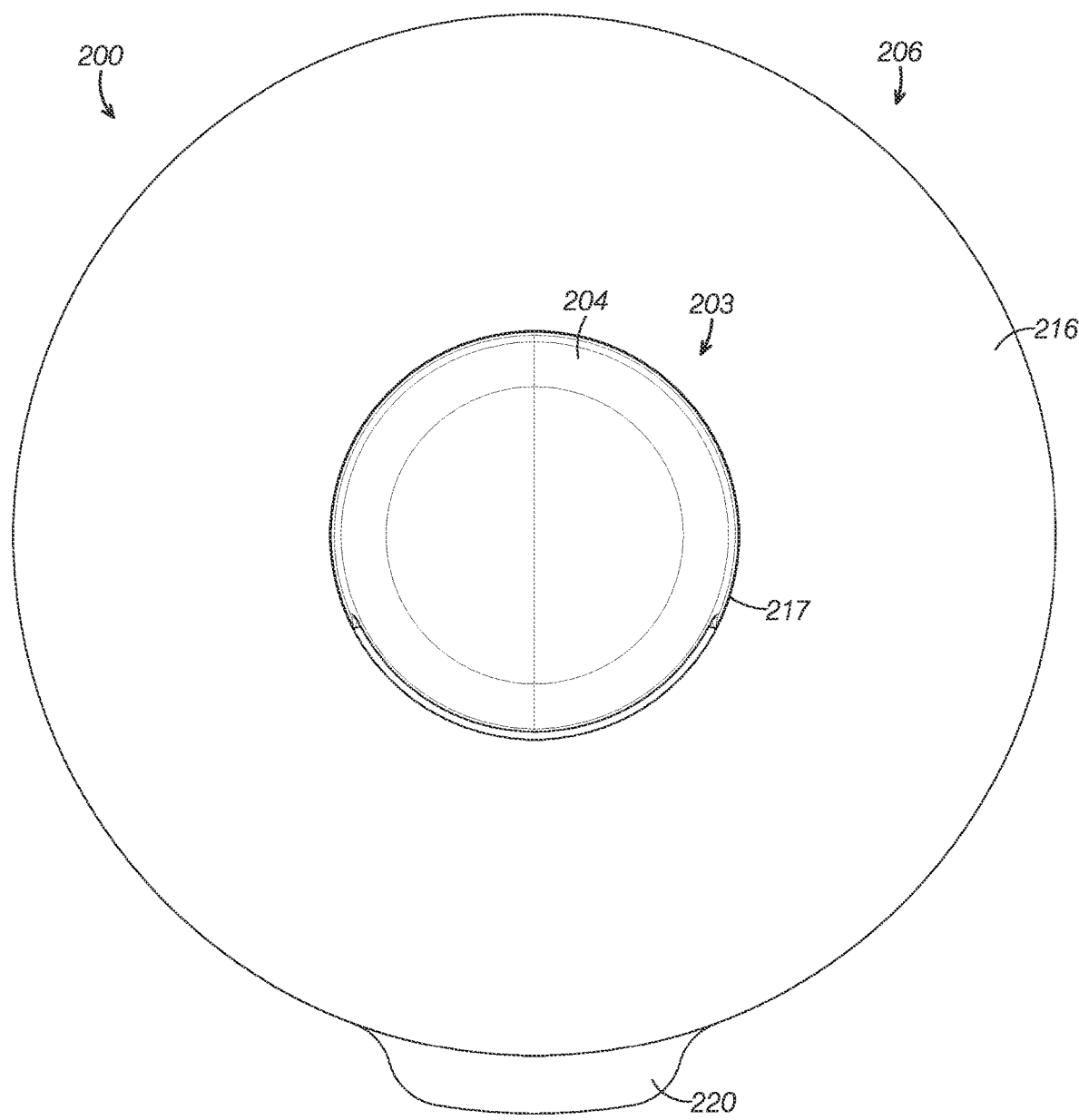
FIG. 14 is a top plan view of the mount shown in FIG. 9.
Figure 15:
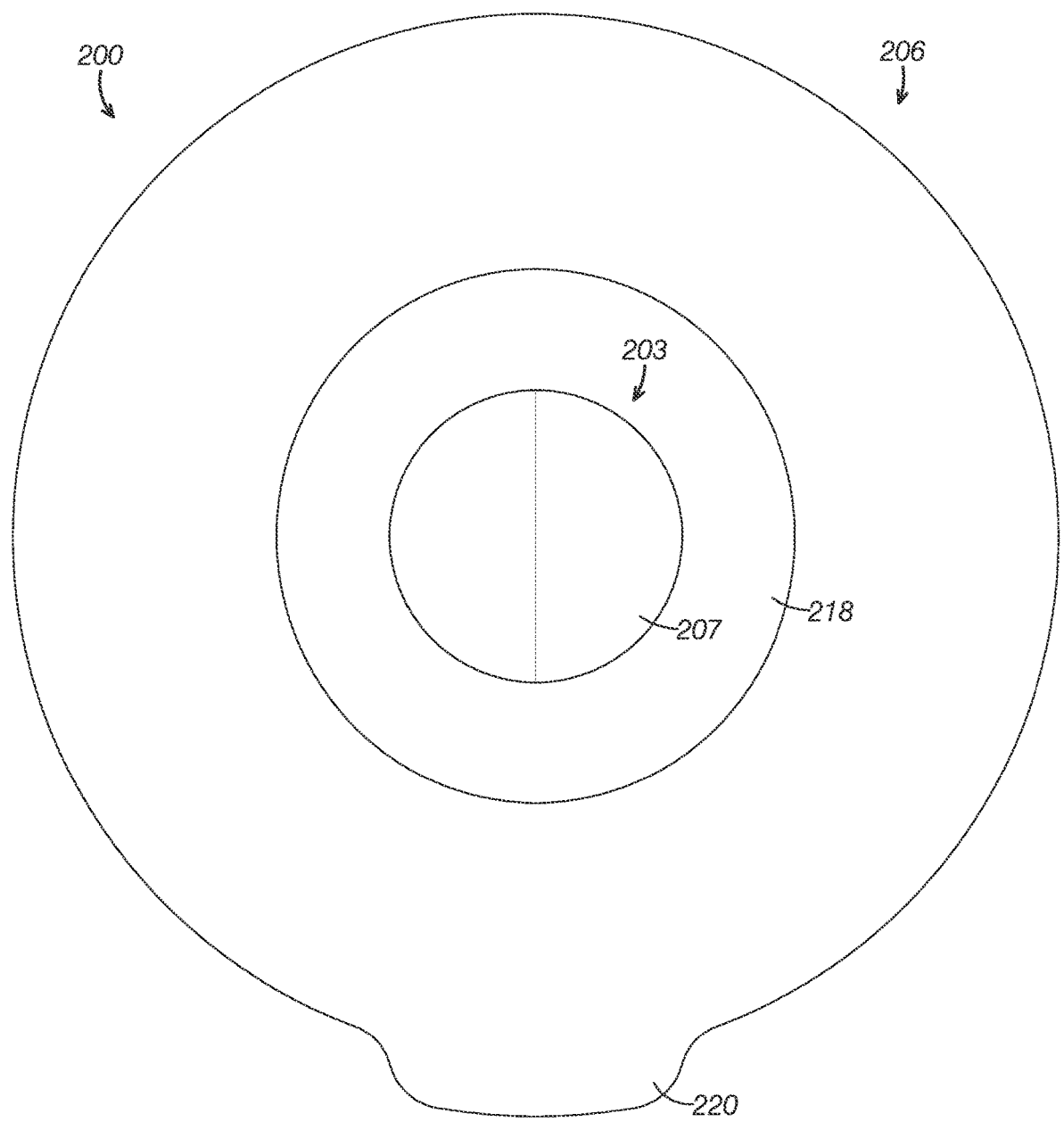
FIG. 15 is a bottom plan view of the mount shown in FIG. 9.
Figure 16:
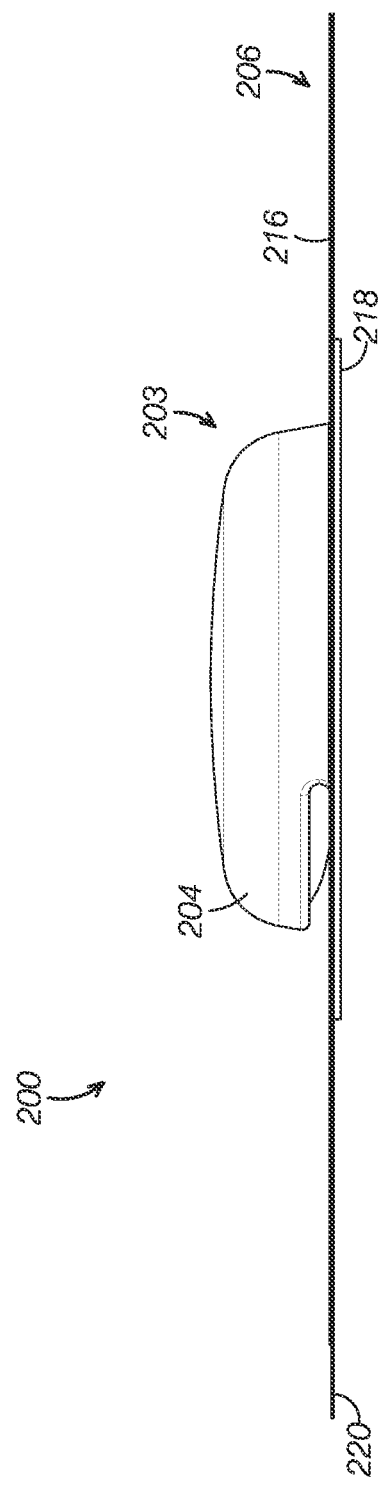
FIG. 16 is a right-side elevation view of the mount shown in FIG. 9.
Figure 17:
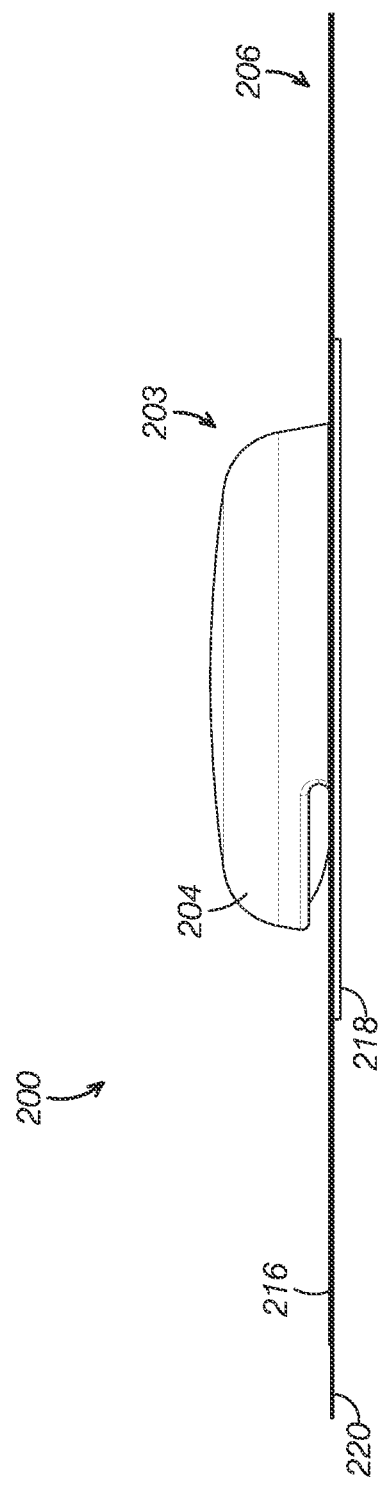
FIG. 17 is a left-side elevation view of the mount shown in FIG. 9.

Fabric expanse 216 functions to flexibly couple case 203 to object 202. As depicted in FIGS. 10, 11, and 14, fabric expanse 216 defines an opening 217. Opening 217 is complementarily configured with case 203 to receive case 203.

The size and shape of the opening may be varied as needed, such as for different sized cases. In some examples, the opening is smaller or larger than depicted in the figures.

The size and shape of the fabric expanse may be varied as needed for a given application. In some examples, the fabric expanse is larger relative to the other components than depicted in the figures. In other examples, the fabric expanse is smaller relative to the other components than depicted in the figures. Further, the reader should understand that the fabric expanse and the other components may all be larger or smaller than described herein while maintaining their relative proportions.

In the present example, the fabric expanse is composed of fabric. However, the fabric expanse may be composed of any currently known or later developed material suitable for flexible backing applications.

Adhesive Layer

The adhesive layer functions to adhere fabric expanse 216 to object 202. The adhesive layer is disposed on fabric expanse 216 and selectively covered by backing layer 220. With reference to FIG. 11, the adhesive layer is spaced from opening 217. With continued reference to FIG. 11, the spacing between the adhesive layer and opening 217 defines a border ring 221.

The size and shape of the border ring may be varied as needed for a given application. In some examples, the border ring is larger relative to the other components than depicted in the figures. In other examples, the border ring is smaller relative to the other components than depicted in the figures. Further, the reader should understand that the border ring and the other components may all be larger or smaller than described herein while maintaining their relative proportions.

The adhesive layer may be any currently known or later developed type of adhesive layer. Various adhesives exist and may be used. In addition to the types of adhesives existing currently, it is contemplated that the mounts described herein could incorporate new types of adhesives developed in the future.

Backing Layer

Backing layer 220 functions to selectively cover adhesive layer with a non-stick layer until a user is ready to adhere fabric expanse 216 to an object. As shown in FIGS. 10-17, backing layer 220 is disposed on the adhesive layer, which is disposed between backing layer 220 and fabric expanse 216. Backing layer 220 is selectively removable to expose the adhesive layer.

Mount Embodiment Three

Turning attention to FIG. 18, a mount 300 will now be described as a third example of a mount. As can be seen in FIG. 18, mount 300 includes a case 303 and a coupler system 306. Coupler system 306 is substantially similar to coupler system 206. Case 303 is configured differently than cases 103 and 203 described above. With reference to FIG. 18, case 303 is described in more detail in the sections below.

Case

The reader can see in FIG. 18 that case 303 includes a body 304 and a cover 307. Cover 307 couples to body 304 via a friction fit. As shown in FIG. 18, body 304 and cover 307 cooperate to receive and protect a tracking device 301 disposed between body 304 and cover 307.

Body 304 includes a sidewall 360 and a flange 318. The components of body 304 are described in the sections below.

Sidewall

Sidewall 360 extends from flange 318 and defines a port 305. As shown in FIG. 18, port 305 is complementarily configured with tracking device 301. Accordingly, tracking device 301 may reside and be protected within port 305.

Cover 307 couples to sidewall 360 via a friction fit. The reader can see in FIG. 18 and that cover 307 and sidewall 360 are complementarily configured. Sidewall 360 couples to cover 307 via a friction fit when sidewall 360 extends through opening 317 of fabric expanse 316. Flange 318 restricts body 304 from passing through opening 317 beyond sidewall 360 extending through opening 317.

Flange

As described above for mount 200, flange 318 functions to interface with fabric expanse 316. With reference to FIG. 18, flange 318 abuts fabric expanse 316 when sidewall 360 extends through opening 317 of fabric expanse 316. Flange 318 abuts fabric expanse 316 within a border ring (not depicted in FIG. 18) defined by a lack of an adhesive layer on fabric expanse 316. Flange 318 abutting fabric expanse 316 restricts case 303 from passing fully through opening 317.

With reference to FIG. 18, the reader can see that flange 318 is adjacent to sidewall 360 of body 304. As shown in FIGS. 18, flange 318 surrounds sidewall 360 and port 305. As depicted in FIG. 18, flange 318 is larger than opening 317 of fabric expanse 316 to restrict case 303 from passing fully through opening 317.

Mount Embodiment Four

Figure 20:
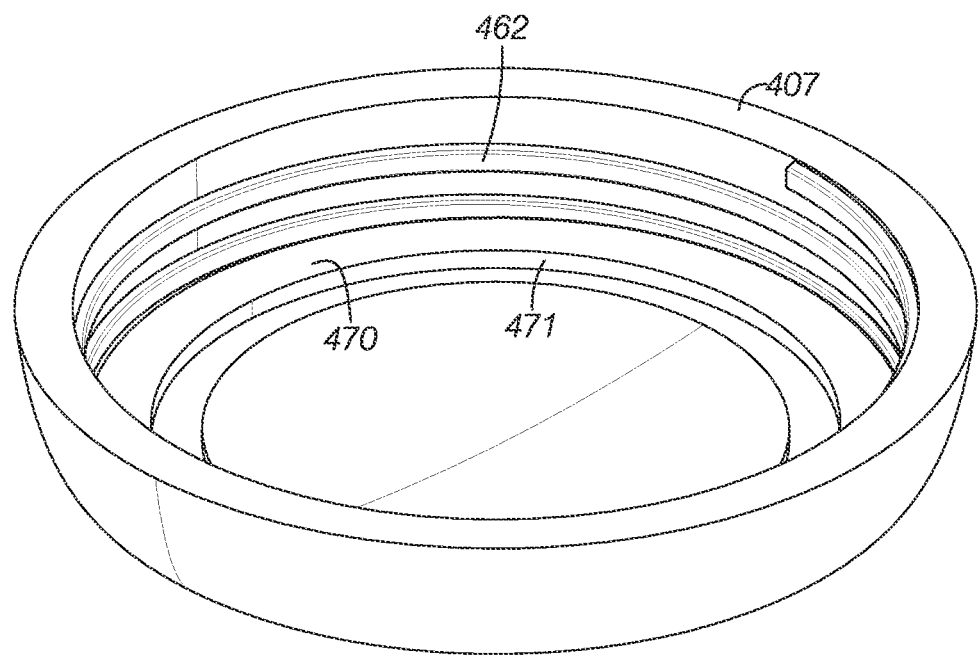
FIG. 20 is a bottom view of the cover depicted in FIG. 19 depicting threads defined inside the cover.

Turning attention to FIGS. 19 and 20, a mount 400 will now be described as a fourth example of a mount. As can be seen in FIG. 19, mount 400 includes a case 403, a coupler system 406, and a spacer 470. Coupler system 406 is substantially similar to coupler systems 206 and 306 described above. Case 403 is configured differently than cases 103, 203, and 303 described above. With reference to FIGS. 19 and 20, case 403 and spacer 470 are described in more detail in the sections below.

Case

The reader can see in FIGS. 19 and 20 that case 403 includes a body 404 and a cover 407. Cover 407 threadingly couples to body 404 via threaded engagement of complementarily threads defined on body 404 and cover 407. As shown in FIG. 19, body 404 and cover 407 cooperate to receive and protect a tracking device 401 disposed between body 404 and cover 407. The reader can see in FIG. 19 that spacer 470 is disposed between cover 407 and tracking device 401 to help secure tracking device 401 between cover 407 and body 404.

Body 404 includes a sidewall 460 and a flange 418. The components of body 404 are described in the sections below.

Sidewall

Sidewall 460 extends from flange 418 and defines a port 405. As shown in FIG. 19, port 405 is complementarily configured with tracking device 401. Accordingly, tracking device 401 may reside and be protected within port 405.

As shown in FIG. 19, sidewall 460 defines body threads 461 projecting outwards opposite port 405. With reference to FIG. 20, the reader can see that cover 407 defines cover threads 462 that complement body threads 461. Cover 407 threadingly couples to sidewall 460 via a threaded engagement of body threads 461 and cover threads 462.

The reader can see in FIG. 19 that the size and shape of cover 407 and sidewall 460 are complementarily configured. Sidewall 460 threadingly couples to cover 407 when sidewall 460 extends through opening 417 of fabric expanse 416. Flange 418 restricts body 404 from passing through opening 417 beyond sidewall 460 extending through opening 417.

Flange

As described above for mounts 200 and 300, flange 418 functions to interface with fabric expanse 416. With reference to FIG. 19, flange 418 abuts fabric expanse 416 when sidewall 460 extends through opening 417 of fabric expanse 416. Flange 418 abuts fabric expanse 416 within a border ring (not depicted in FIG. 19) defined by a lack of an adhesive layer on fabric expanse 416. Flange 418 abutting fabric expanse 416 restricts case 403 from passing fully through opening 417.

With reference to FIG. 19, the reader can see that flange 418 is adjacent to sidewall 460 of body 404. As shown in FIGS. 19, flange 418 surrounds sidewall 460 and port 405. As depicted in FIG. 19, flange 418 is larger than opening 417 of fabric expanse 416 to restrict case 403 from passing fully through opening 417.

Spacer

Spacer 470 functions to secure tracking device 401 between cover 407 and body 404. As shown in FIGS. 19 and 20, spacer 470 is disposed within cover 407.

In the example shown in FIGS. 19 and 20, spacer 470 is in the shape of a ring. However, the spacer may be any suitable shape. As shown in FIG. 19, spacer 470 is complementarily configured with tracking device 401. Spacer 470 receives a portion of tracking device 401 within an opening 471 defined by the ring shape of spacer 470 to laterally support tracking device 401.

In the present example, spacer 470 is resiliently compressible. Spacer 470 compresses between cover 407 and tracking device 401 when cover 407 threadingly couples to body 404. Spacer 470 compressing between cover 407 and tracking device 401 functions to more tightly secure tracking device 401 between spacer 470 and body 404 when cover 407 threadingly couples to body 404.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. A mount for securing a tracking device to an object, the mount comprising:
    a case including a body defining a port complementarily configured with the tracking device to receive the tracking device, wherein the case further comprises a cover configured to selectively couple to the body in a position enclosing the tracking device within the port; and
    a coupler system configured to couple the case to the object and including a fabric expanse, wherein the fabric expanse defines a fabric-expanse opening complementarily configured with the case to receive the case.

2. The mount of claim 1, wherein the case is formed from plastic.

3. The mount of claim 1, wherein the case is impact resistant.

4. The mount of claim 1, wherein the case is deformation resistant.

5. The mount of claim 1, wherein the cover selectively couples to the body via a friction fit.

6. The mount of claim 1, wherein:
    the body defines body threads extending around an outer periphery of the body;
    the cover defines cover threads extending around an inner portion of the cover; and
    the cover threads are complementarily configured with the body threads to enable the cover to threadingly couple to the body.

7. The mount of claim 6, wherein the mount further includes a spacer disposed within the cover.

8. The mount of claim 7, wherein the spacer is in the shape of a ring and is complementarily configured with the tracking device to receive a portion of the tracking device within a spacer opening defined by the ring shape.

9. The mount of claim 8, wherein the spacer is resiliently compressible and compresses between the cover and the tracking device to secure the tracking device between the spacer and the body when the cover threadingly couples to the body.

10. The mount of claim 1, wherein the case is substantially seamless when the cover selectively couples to the body.

11. The mount of claim 1, wherein:
    the case defines a flange coupled to the body;
    the flange is larger than the fabric-expanse opening; and
    the flange abuts the fabric expanse when the body extends through the fabric-expanse opening to restrict the case from passing fully through the fabric-expanse opening.

12. The mount of claim 11, wherein the flange surrounds the port.

13. The mount of claim 1 wherein the coupler system includes an adhesive layer disposed on the fabric expanse.

14. The mount of claim 13, wherein the coupler system includes a backing layer disposed on the adhesive layer.

15. The mount of claim 14, wherein the backing layer is selectively removable to expose the adhesive layer.

16. The mount of claim 1, wherein:
    the coupler system includes an adhesive layer disposed on the fabric expanse; and the adhesive layer is spaced from the fabric-expanse opening to define a border ring.

17. The mount of claim 16, wherein the case defines a flange coupled to the body, and wherein the flange abuts the fabric expanse within the border ring when the case is received within the fabric-expanse opening of the fabric expanse.

18. A mount for securing a tracking device to an object, the mount comprising:
    a case, comprising a body and a flange extending from the body and having a flange diameter, wherein the case defines a port complementarily configured with the tracking device to receive the tracking device, wherein the case further comprises a cover configured to selectively couple to the body in a position enclosing the tracking device within the port; and
    a coupler system having a first side and a second side opposite the first side, wherein the coupler system is configured to couple the case to the object, wherein the coupler system comprises a fabric expanse, an adhesive layer disposed on the fabric expanse on the first side, and a backing layer disposed on the adhesive layer and selectively removable to expose the adhesive layer, wherein the fabric expanse defines a fabric-expanse opening having an opening diameter than is smaller than the flange diameter;
    wherein the case extends through the fabric-expanse opening and the flange abuts the coupler system on the first side, and wherein the cover is positioned on the second side of the coupler system.

* * * * *